Figure 1:
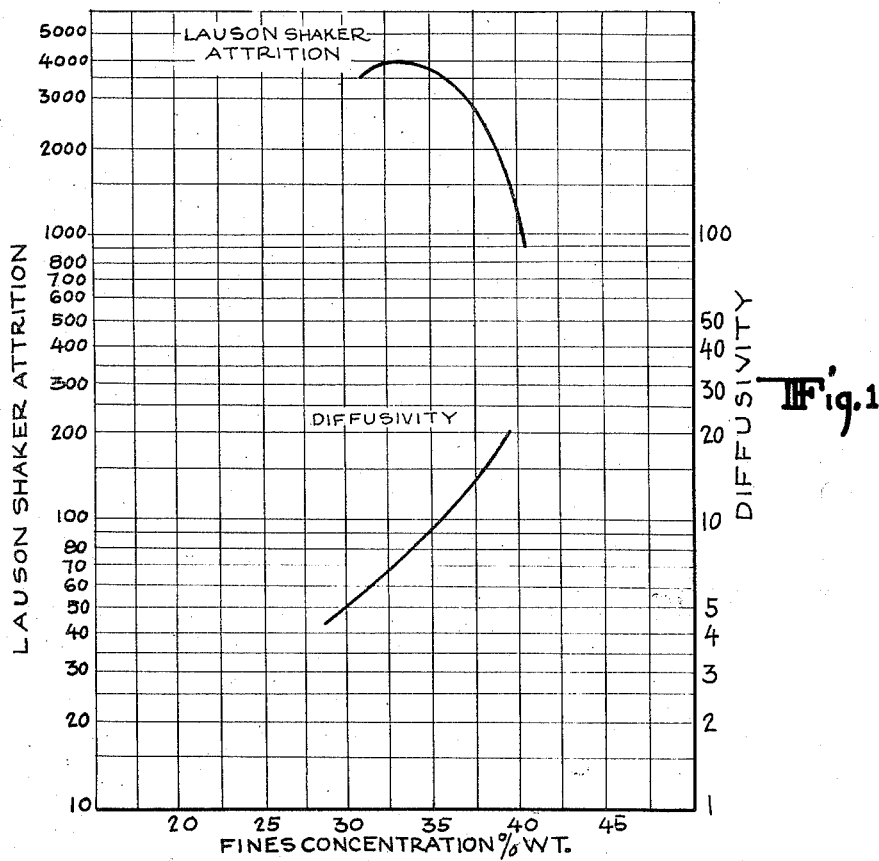

Sept. 6, 1960  R. H. CRAMER ET AL  2,951,815
CATALYTIC CONVERSION WITH HIGH DENSITY CATALYST
Filed Sept. 15, 1958  2 Sheets-Sheet 2

INVENTORS
Robert H. Cramer
Abbott F. Houser
BY Raymond W. Barclay
ATTORNEY

United States Patent Office 2,951,815
Patented Sept. 6, 1960

2,951,815

CATALYTIC CONVERSION WITH HIGH DENSITY CATALYST

Robert H. Cramer, Woodbury, and Abbott F. Houser, Delaware Township, Camden County, N.J., assignors to Socony Mobil Oil Company, Inc., a corporation of New York Filed Sept. 15, 1958, Ser. No. 761,146

7 Claims. (Cl. 252—453)

This invention relates to the catalytic conversion of hydrocarbon oils into lower boiling normally liquid and normally gaseous products and to an improved catalyst for effecting said conversion. More specifically, the invention relates to the catalytic cracking of hydrocarbon oils in the presence of a new and improved catalyst. In one embodiment, the invention is concerned with an improved silica-alumina cracking catalyst characterized by an unusually effective combination of physical attributes; specifically by a high resistance to attrition, high stability to deactivation by steam, high density and high diffusivity. In another embodiment, the invention is directed to an improved method for preparing silica-alumina composites of such characteristics useful in catalytic cracking of heavy petroleum fractions to lighter materials boiling in the gasoline range.

As is well known, there are numerous materials, both of natural and synthetic origin, which have the ability to catalyze the cracking of hydrocarbons. However, the mere ability to catalyze cracking is far from sufficient to afford a catalyst of commercial significance. Of the presently commercially available cracking catalysts, a synthetic silica-alumina composite catalyst is by far the most widely used. While such type catalyst is superior in many ways to the earlier employed clay catalysts and is fairly satisfactory, it is generally lacking in one or more of the physical attributes desired in a present day cracking catalyst.

Thus, modern catalytic cracking processes require a catalyst which is not only specifically active in the chemical reactions which are to be catalyzed but also possesses physical characteristics required for commercially successful operation. One of the outstanding physical attributes of a commercial catalyst is hardness, i.e. the ability to resist attrition. The ability of a particle to hold its shape in withstanding the mechanical handling to which it is subjected upon storage, shipment, and use is a primary requirement for a successful cracking catalyst and for modern catalytic processes utilizing such catalyst. Thus, catalytic cracking operations in which heavy petroleum fractions are converted to lighter materials boiling in the range of gasoline are carried out in the presence of a solid porous catalyst and generally a composite of silica-alumina which may contain a minor proportion of one or more added metals or metal oxides. These catalytic processes are generally advantageously carried out employing methods wherein the catalyst or contact mass is subjected to continuous handling. In such operations, a continuously moving stream of hydrocarbon feed is contacted with a continuously moving stream of catalyst for the accomplishment of conversion and thereafter the catalytic material is continuously regenerated and returned to the conversion zone. This continuous handling and regeneration of the catalyst particles results in considerable breakage and constant abrasion, consuming the catalyst and giving rise to an excessive amount of fines which are a loss since they generally cannot be re-used in the same catalytic equipment. Furthermore, there is a tendency for the catalyst fines suspended in the gas or vapor present to act as an abrasive in a manner analogous to sand blasting. This not only wears away the equipment but also causes the catalyst to take up foreign matter detrimental to its catalytic properties. A hard, porous cracking catalyst having the ability to withstand abrasion during the necessary handling involved during continual conversion and regeneration, is definitely desirable in overcoming the aforementioned disadvantages.

Another important physical property of solid porous cracking catalyst is the density thereof. Increasing the density of such catalyst results in increased seal-leg, vapor disengaging and carbon burning capacity in moving bed catalytic cracking units. Increasing catalyst density will therefore permit greater hydrocarbon throughput and catalyst circulation rates in existing units or, alternatively, afford handling of the same capacity in smaller cracking units.

Another physical property desirable in a cracking catalyst is steam stability, i.e. the ability not to become deactivated in the presence of steam at an excessively high rate. During the cracking operation, heavy carbonaceous materials commonly referred to as coke, deposit on the catalyst and prevent contact between the catalytic surface and the hydrocarbon charge. As a result of coke formation, it is necessary to regenerate the catalyst at frequent intervals, first by stripping out entrained oil by contacting with steam and then burning off the carbonaceous deposits by contacting with an oxygen-containing gas, such as air, at elevated temperatures. However, it has been found that the cracking activity of the catalyst deteriorates upon repeated use and regeneration and that silica-alumina catalysts are very sensitive to steaming. Since steaming has been found to be the most effective way of removing entrained oil from the spent catalyst prior to thermal regeneration with air, it is apparent that a catalyst characterized by good steam stability is definitely to be desired.

Still another important physical attribute of a modern-day cracking catalyst is its diffusivity. The diffusivity of a catalyst is a measured property which characterizes the ability of fluids to diffuse therethrough. A high catalyst diffusivity permits more rapid diffusion of hydrocarbon vapors and other gases throughout the catalyst structure, thereby making possible the use of higher space velocities of hydrocarbons and requiring less time for regeneration of the catalysts when they have become fouled with carbonaceous materials. In present commercial cracking units, carbon burning capacity of the regenerator is the primary limiting factor on conversion capacity for the unit and on conversion level per pass. It is accordingly highly desirable to increase carbon burning capacity by improving the carbon burning rate for the spent catalysts.

It has heretofore been reported that catalysts having one or another of the above characteristics individually have been prepared and tested for catalytic cracking. Such other catalysts, although they may be equal to the present catalyst in one respect or another, are less successful in other respects and are therefore inferior. Thus, while catalysts are known which may be equal in effectiveness to the catalyst of the present invention in any one given respect, none of them, as far as known, has combined the advantages found in the present catalyst.

The above specified characteristics of the catalyst described herein are achieved by specific control and adjustment of the various interdependent factors involved in production of the catalyst. In one embodiment, the present invention comprises a method for manufacturing an attrition resistant catalyst consisting essentially of silica and alumina, highly stable to deactivation by steam, characterized by a high diffusivity and an apparent density of at least 0.9 gram/cc. by dispersing in a silica-alumina sol containing, on a dry basis, a major proportion of silica and a minor proportion of between about 10 and about 15 percent by weight of alumina, an amount corresponding to between about 30 and about 45 percent by weight of the resulting dry composite of finely divided alpha alumina which has undergone previous calcination at a temperature in excess of 2000° F. and which has a weight mean particle diameter of between about 2 and about 7 microns, the concentrations and proportions of reactants being such that the resulting silica-alumina sol having the finely divided calcined alpha alumina dispersed therein has a pH of between 8.5 and 9 and a product concentration of between 10 and 15, permitting the resulting sol to set to a hydrogel, hydrothermally treating the resulting hydrogel at a temperature of between 80° F. and 200° F. for 6 to 24 hours, and thereafter washing the hydrogel free of water soluble matter, drying and calcining.

Another embodiment of the invention affords a method for manufacturing a catalyst of the above indicated characteristics by intimately contacting an aqueous acid solution of a water soluble aluminum salt in which the equivalent ratio of hydrogen, derived from the acid, to aluminum, derived from the aluminum salt, is at least 0.21, an aqueous alkali metal silicate solution in which the weight ratio of alkali metal oxide to silica is at least 0.34 and an aqueous slurry of calcined alpha alumina powder having a weight mean particle diameter of between about 2 and about 7 microns present in an amount corresponding to between about 30 and about 45 percent by weight of the resulting dry composite, under conditions such that the resulting silica-alumina hydrosol, having the powdered calcined alpha alumina dispersed therein has a pH of between 8.5 and 9, a product concentration of between 10 and 15 and in which the content of alumina combined with silica in the silica-alumina hydrosol corresponds to between about 10 and about 15 percent by weight on a dry basis, permitting the resulting sol to set to a hydrogel, hydrothermally treating the resulting hydrogel at a temperature of between 80° F. and 200° F. for 6 to 24 hours, base-exchanging zeolitic alkali metal from the treated hydrogel, washing the hydrogel free of water soluble matter, drying and calcining.

In another embodiment, the present invention provides a synthetic cracking catalyst produced in accordance with the foregoing method and consisting essentially of silica and alumina characterized by an apparent density of at least 0.9 gram per cubic centimeter and having 30 to 45 percent by weight of powdered calcined alpha alumina of a weight mean particle diameter of 2 to 7 microns interdispersed in the structure of a silica-alumina cogel, in which the content of cogelled alumina is between about 10 and about 15 percent by weight.

Another embodiment of the invention resides in a process for catalytic cracking of hydrocarbon oils in the presence of the above catalyst in accordance with which a higher conversion of the charge stock to useful products is realized.

A still further embodiment of the invention involves a process for catalytic conversion of hydrocarbon oils containing a minor amount of metal contaminant in the presence of the above catalyst in accordance with which the extent of conversion of the charge stock to useful products is not adversely affected by the presence of said metal contaminant.

The finely divided calcined alpha alumina employed as one of the reactants herein is composed of alpha alumina which has undergone calcination at a temperature in excess of 2000° F. such that the surface area normally present at low temperature is largely destroyed. Alcoa A-2 Alumina has been found to be a particularly effective form of alumina fulfilling the above requirements. A-2 Alumina is characterized by a hexagonal crystalline structure and has the following properties:

CHEMICAL ANALYSIS, PERCENT

| | |
|---|---|
| $Al_2O_3$ | 99 |
| $Na_2O$ | 0.50 |
| $Fe_2O_3$ | 0.04 |
| $SiO_2$ | 0.025 |
| Loss on ignition 1100° C | 0.30 |
| Water adsorbed at 50% humidity | 0.10 |
| Alpha Alumina content, percent | 90+ |

PHYSICAL PROPERTIES

| | |
|---|---|
| Bulk density, packed, lb./ft.$^3$ | 68 |
| Bulk density, loose lb./ft.$^3$ | 52 |
| Specific gravity | 3.7–3.9 |
| Surface area, m.$^2$/g | 0.4 |
| Pore volume, ml./g | 0.25 |
| Pore diameter, A° | 15,000 |

It is essential in order to achieve the desired characteristics of high density, high diffusivity, and high resistance to attrition that the particle size of the calcined alpha alumina incorporated in the silica-alumina sol be within the approximate range of 2 to 7 microns in weight mean particle diameter. It is further essential in achieving the above-desired catalyst characteristics that the amount of finely divided alpha alumina incorporated into the silica-alumina sol be within the approximate range of 30 to 45 percent by weight.

The acidic aluminum salt solution employed as another of the reactants herein may be any of the readily available water soluble normal salts such as, for example, aluminum chloride, aluminum nitrate, aluminum sulfate, and the like. The acid contained in such solution is generally, but not necessarily, characterized by the same acid anion as the aluminum salt employed. Thus, an acidic aluminum salt solution of aluminum sulfate containing sulfuric acid has been found to afford highly satisfactory results in manufacture of the present catalyst. It is necessary that the equivalent ratio of hydrogen, derived from the acid, to aluminum, derived from the aluminum salt, be at least 0.21 in order to prevent fluocculation of the finely divided calcined alpha alumina in the hydrosol during the gelation period. It has been found that if the above equivalent ratio fell below 0.21, flocculation of the finely divided alpha alumina present in the hydrosol occurred leading to a heterogeneous, physically weak product thereby defeating the objective of producing a highly attrition resistant catalyst. The above ratio can be readily controlled by the addition of a requisite amount of acid to the aluminum salt solution prior to contact of such solution with the other reactants.

The alkali metal silicate reactant employed in the preparation of the present catalysts is generally sodium silicate but it is contemplated that other alkali metal silicates such as potassium silicate may, likewise, be used. The alkali metal oxide to silica weight ratio of the alkali metal silicate, for example, in sodium silicate the $Na_2O/SiO_2$ ratio is necessarily greater than 0.34 to prevent flocculation of the finely divided alpha alumina in the hydrosol during gelation. It has been found that if the above ratio fell below 0.34, flocculation of the finely divided alpha alumina present in the hydrosol occurred leading to a heterogeneous physically weak product, as noted hereinabove. The above ratio can be controlled by preparation of an alkali metal silicate in which the alkali metal oxide to silica weight ratio is above 0.34 or by the addition of the appropriate alkali metal hydroxide to a commercially available alkali metal silicate solution in which the above-noted ratio was below 0.34. For example, the $Na_2O/SiO_2$ weight ratio of commercial "N" brand sodium silicate solution normally 0.31 can be raised to above 0.34 by the addition thereto of sodium hydroxide. The concentration of alkali metal silicate solutions employed in the present process is generally such that the silica content thereof is between about 10 and about 30 percent by weight.

In accordance with the process of the invention, a silica-alumina hydrosol is prepared containing between about 30 and about 45 percent by weight based on the ultimately dried catalyst of a powdered alpha alumina which has undergone previous calcination at a temperature in excess of 2000° F. and which has a weight mean particle diameter of between about 2 and about 7 microns. It has been found that the above particle size is an essential factor in imparting the desired attrition resistance to the prepared catalyst. The powdered material may be added by dispersing in an already prepared hydrosol or as is preferable, where the hydrosol is characterized by a short time of gelation, the powder may be added to one or more of the reactants used in forming the hydrosol or may be admixed in the form of a separate stream with streams of the hydrosol forming reactants in a mixing nozzle or other means where the reactants are brought into intimate contact.

The particle size distribution of the highly calcined alpha alumina introduced into the silica-alumina hydrosol in accordance with the present process was determined by sedimentation methods. The weight mean particle diameters were determined by plotting the cumulative percent of alpha alumina smaller than a given diameter against particle diameter, dividing the total size range into a number of small fractions and calculating as follows:

$$\text{weight mean diameter} = \frac{\sum d_i g_i}{\sum g_i}$$

wherein $d_i$ is the mean particle size of the fraction in microns and $g_i$ is the corresponding weight percent material in the fraction. The percent volume fines in the dried gel was calculated from the particle densities of powdered material, i.e., the density of the material excluding void space between the particles but including pore volume of the particles and of dried gel which contained no added powder.

In addition to having the above-noted particle size, the calcined alpha alumina incorporated in the hydrosol should necessarily be insoluble therein and should further be characterized by being infusible at the hydrogel drying temperature. The form of hydrogel is necessarily maintained substantially constant from a time prior to gelation until after the gel has been dried. During drying, the hydrogel undergoes considerable shrinkage. The drying is carried to a stage beyond that at which maximum shrinkage of the gel is obtained. The gel, after syneresis or shrinkage thereof has been completed, is substantially dry, that is, the gel possesses open pores free of liquid although it still contains a relatively small percentage of water which is evolved upon subjecting the gel to a relatively high temperature. Hydrogel containing calcined alumina powder dispersed therein prepared as in the present process may be dried at room temperatures or at higher temperatures in air or steam as well as in various inert or reducing atmospheres. While the prepared hydrogel may be dried at ambient temperature by merely exposing to the air, it is preferred to accelerate the removal of liquid content from the hydrogel by drying at a temperature in the range of about 150° F. to about 400° F. until shrinkage of the hydrogel is substantially complete. Drying may be carried out in air or superheated steam. To impart maximum attrition resistance to the gel, it is further preferred to subject the dried gel to calcination in an inert gas, air, steam, or mixtures thereof at a temperature below that at which sintering is encountered and generally in the approximate range of 1150° F. to 1400° F. for a period of about 1 hour or more, generally from about 1 hour to about 24 hours. It is to be understood that the present process is applicable in imparting hardness characteristics to gels which have been dried to the point of maximum shrinkage and which may thereafter undergo the described further drying and/or calcining treatment. In every instance, at a comparable stage of drying or thermal treatment, the gel containing the powdered calcined alumina described herein was harder than a gel containing such alumina material of larger particle size or gel prepared in the absence of added alumina material. Thus, the improvement in resistance to attrition is obtained both in the case of gels which had been merely dried and in the case of gels which had undergone calcination. The latter gels, however, exhibited optimum hardness and it is accordingly preferred to subject the gels prepared as described herein to a final calcination treatment.

The powder incorporated in the sol in accordance with the present invention, as previously noted is a highly calcined form of alpha alumina. The particular form of alumina employed is critical in achieving the desired catalyst characteristics of high density, high diffusivity, and resistance to attrition. It is essential that the powdered calcined alumina have a weight mean particle diameter in the range of 2 to 7 microns; that it be insoluble in the sol, i.e. that it maintain its powdered status upon dispersion in the sol and that it be infusible at the temperature of drying the hydrogel and at the temperature of calcination. The reason for the unusual hardness characteristics of the present gel catalyst is not known with certainty. It would appear however, that some cementation or hardening takes place during the setting and/or drying of the hydrogel containing the specified highly calcined alumina.

The pH of the hydrosol containing finely divided dispersed calcined alpha alumina must necessarily and essentially be precisely controlled within the relatively narrow range of 8.5 to 9 to achieve the advantages of the invention. If the pH is below 8.5, the resulting hydrogel is not responsive to subsequent hydrothermal treatment which step necessarily is employed to retain the activity and to control the pore size of the finished catalyst. On the other hand, if the pH of the hydrosol exceeds 9, the resulting hydrogel upon subsequent hydrothermal treatment undergoes an exaggerated response resulting in a catalyst having poor stability when employed in the cracking of hydrocarbon oils to lighter materials.

The product concentration (p.c.) of the hydrosol containing finely divided dispersed calcined alpha alumina obtained in accordance with the process described herein is another variable which must be subject to close control in order to achieve the benefits of the invention. Product concentration, as utilized herein, refers to the total content of product solids present in the freshly formed hydrogel multiplied by 100 and divided by the sum of the total solids and water contained in the hydrogel. It is essential to the success of the present process that the product concentration (p.c.) of the hydrosol obtained be within the range of 10 to 15. With a product concentration of less than 10, the hydrogel is too weak to withstand mechanical handling, such as sluicing and washing during the course of manufacture. With a product concentration of more than 15, flocculation of the finely divided alpha alumina present in the hydrosol occurs, leading to a heterogeneous physically weak product.

In order that the finished silica-alumina catalyst possess the requisite stability to deactivation by steam, it is essential that the cogelled alumina content of the initially formed hydrosol be at least about 10 percent by weight and preferably in the range of 10 to 15 percent by weight. In this regard, it was found that hydrosols having a content of cogelled alumina, i.e. alumina combined with silica in the hydrosol or hydrogel state, as distinguished from the added finely divided calcined alpha alumina, of less than about 10 percent by weight failed to possess the requisite steam stability. It is accordingly essential that the cogelled alumina content of the initially formed hydrosol be at least about 10 percent by weight. Since approximately 3 percent by weight of alumina is ordinarily introduced during the base exchange step by replacement of zeolitic alkali metal with aluminum, it will be appreciated that the cogelled alumina content of the hydrogel, after base exchange, is at least about 13 percent by weight.

The intermediate hydrogel state obtained in preparation of present catalysts is to be distinguished from a gelatinous precipitate. True all-embracing hydrogels occupy the entire volume of the solution from which they are formed and possess a definitely rigid structure. When fractured, a true hydrogel shows a conchoidal fracture as compared to an irregular ragged edge fracture as obtained in the case of gelatinous precipitates. The latter occupy only a part of the volume of the solution from which they are formed and have no rigidity of structure. In addition, hydrogels can generally be more easily washed free of soluble impurities due to the tendency of gelatinous precipitates to peptize on washing. A distinct and further advantage of hydrogels is that due to their rigid structure, they can be formed into high quality spheroidal particles.

The resulting silica-alumina hydrogel having finely divided calcined alpha alumina dispersed therein is subjected to a hydrothermal treatment which involves contacting the hydrogel with water at an elevated temperature for a specified period of time. It is essential in obtaining a cracking catalyst of requisite activity that the hydrogel undergo hydrothermal treatment at a temperature within the approximate range of 80° F. to 200° F. for a period of between about 6 and about 24 hours, the time and temperature of the hydrothermal treatment being so correlated and controlled that the finished catalyst is characterized by an apparent density in the range of 0.90 and 1.10 grams per cubic centimeter. Too mild or too severe hot water treat conditions decrease catalyst activity. Catalyst density can be controlled by decreasing the severity of the above hydrothermal treatment, but this results in a catalyst product having poor diffusivity.

The hydrogel after hydrothermal treatment is subjected to a base exchange treatment to remove zeolitic alkali metal introduced into the hydrogel through the use of an alkali metal silicate reactant. The hydrogel may be base-exchanged with a suitable aqueous solution containing an ion capable of replacing zeolitic alkali metal, which ion does not detrimentally affect the finished catalyst. Thus, the base exchange solution employed may effect replacement of zeolitic alkali metal without involving the introduction of an additional metal or metal compound in the hydrogel, such as treatment with a solution of an aluminum salt, an ammonium salt or an acid. By using a base exchange solution of a metal salt other than a metal already contained in the hydrogel, it is possible to introduce quantities of an additional metal oxide into the gel composite. The incorporation of such additional metal oxide into the hydrogel may desirably act as a catalytic promoter under particular reaction conditions. Under normal conditions of operation, however, it is contemplated that the base exchange solution utilized herein will comprise an aqueous aluminum salt solution such as aluminum nitrate, aluminum chloride, aluminum sulfate and the like enabling replacement of the zeolitic alkali metal in the hydrogel with aluminum during course of the base exchange operation.

The hydrogel product after base exchange is water washed free of soluble matter. The washed hydrogel is then dried, suitably in an atmosphere of superheated steam, at a temperature of about 150° F. to about 400° F. The dried product is thereafter calcined, suitably in an atmosphere of air and/or steam, at a temperature of 1150° F. to 1400° F. to yield a high density, highly attrition-resistant finished catalyst.

The process described herein may be employed in the preparation of a silica-alumina cracking catalyst in any desired physical form. Thus, the hydrosol containing added alpha alumina powder may be permitted to set in mass to a hydrogel which is thereafter dried and broken into pieces of desired size. The pieces of gel so obtained are generally of irregular shape. Uniformly shaped pieces of gel may be obtained by extrusion or pelleting of the powder-containing hydrogel. Also the hydrosol may be introduced into the perforations of a perforated plate and retained therein until the sol has set to a hydrogel after which the formed hydrogel pieces are removed from the plate. The method of the invention is especially useful as applied to the manufacture of spherically shaped gel particles produced by any feasible process such as that described in patents to Marisic, for example, U.S. 2,384,946. Broadly, such methods involve introducing globules of hydrosol into a column of water-immiscible liquid, for example, an oil medium wherein the globules of hydrosol set to spheroidal bead-like particles of hydrogel. Larger size spheres are ordinarily within the range of from about 1/64 to about 1/2 inch in diameter whereas smaller size spheres which are generally referred to as microspheres are within the range of from about 10 to about 100 microns in diameter. The use of spherically shaped gel particles is of particular advantage in hydrocarbon conversion processes including the moving catalyst bed process, the fluidized process and other processes in which the spheroidal silica-alumina cracking catalyst particles are subjected to continuous movement. As applied to the stationary bed, spheroidal gel catalyst particles provide effective contact between the reactants and the catalyst by avoiding channeling.

It is accordingly a preferred embodiment of the present invention to prepare the described high density attrition-resistant silica-alumina catalyst in the form of spheres although it is to be realized that the method hereinafter set forth may also be employed in obtaining a mass of gel which may thereafter be broken up into particles of desired size. Likewise, the method described herein may be used in the preparation of silica-alumina cracking catalysts in the form of particles of any other desired size or shape.

Steam stability of the catalyst prepared in accordance with the method described herein was determined by an accelerated test which simulates the conditions encountered during catalyst use. In this test, the catalyst is contacted with 100 percent steam at 1200° F. and 15 p.s.i.g. pressure for 30 hours and the cracking activity is then determined and compared with the cracking activity of fresh, unsteamed catalyst. The results thus obtained are indicative of the stability of the catalyst.

The cracking activity of the catalyst is a measure of its capacity to catalyze conversion of hydrocarbons and is expressed herein as the percentage conversion of a Mid-Continent gas oil having a boiling range of 450 to 950° F. to gasoline having an end point of 410° F. by passing vapors of the said gas oil through the catalyst at 875° F., substantially atmospheric pressure and a feed rate of 1.5 volumes of liquid oil per volume of catalyst per hour for ten minute runs between regenerations. The catalyst described herein is desirably characterized by a conversion, at equilibrium, determined on the above basis within the approximate range of 40 to 50.

The diffusivity of the catalyst is a measure of the ability of fluids to diffuse therethrough and is determined by measuring the rate at which hydrogen under a constant partial pressure, at essentially atmospheric conditions, will pass through a single catalyst particle having a size of 5 to 6 mesh (Tyler). The diffusivity is the average of such determinations on fifteen particles and is expressed as cubic centimeters of hydrogen per centimeter of catalyst per second X $10^3$. The catalyst described herein is desirably characterized by a diffusivity determined on the above basis of at least 10 and generally within the range of 15 to 30.

The term "apparent density" as utilized herein refers to the weight as compared with the volume occupied by a packed mass of the catalyst particles. It is determined by weighing a fairly large volume of the catalyst particles. For example, a large diameter graduated cylinder is filled to a volume calibration gently tamped down and the weight of the particles determined by difference in weight of the graduate before and after filling with the particles. The catalyst of the present invention is characterized by an apparent density of at least 0.9 gram per cubic centimeter and generally within the range of 0.9 to 1.10 grams per cubic centimeter.

The attrition characteristics of the catalysts prepared in accordance with the method described herein were determined by an attrition test known as the Lauson Shaker Attrition (LSA) test. The procedure used in the test consists of shaking a 50 cc. sample of the product to be tested in a closed steel cup which is bolted to the piston of a motor-driven Lauson engine which operates at 1000 r.p.m. After shaking for a time sufficient to produce 10 weight percent fines, capable of passing through an 8 mesh (Tyler) screen, the sample is screened, weighed and the percentage loss is calculated. These operations are repeated until slightly more than half the sample has been reduced to fines. Cumulative losses are plotted against total shaking time. The cumulative time in seconds for 50 percent weight of fines is read from the curve and is reported as the Lauson Shaker Attrition. Since the LSA of gels is affected by the size of the particles tested, the attrition data reported herein corespond to that of particles having an average particle diameter of 0.140 inch to avoid the interferences of these variables in correlating the effect of quantity and size of added material on attrition. The catalyst described herein is characterized by a LSA attrition resistance of at least 1000 seconds and generally within the approximate range of 1500 to 3000 seconds.

The following examples will serve to illustrate the present invention without limiting the same:

*Example 1*

Silica-alumina gel containing a small amount of chromia was prepared by mixing streams comprising:

(1) Sulfuric acid-aluminum sulfate containing a minor proportion of potassium chrome-alum, (2) Sodium silicate solution, (3) An aqueous slurry of finely divided calcined alpha alumina.

The sulfuric acid-aluminum sulfate stream was composed of 1.45 percent by weight of sulfuric acid, 5.25 percent by weight of aluminum sulfate, 0.22 percent by weight of potassium chrome-alum and 93.08 percent by weight of water. The sodium silicate stream was composed of 39.75 weight percent of water and 58.95 percent by weight of N-Brand sodium silicate and 1.30 percent by weight sodium hydroxide. The alumina slurry stream was composed of 20 percent by weight of Alcoa A-2 alumina having a weight mean particle diameter of 4.1 microns and 80 percent by weight of water. The sodium silicate stream and the alumina slurry stream were initially combined to yield a mixture containing 36.74 percent by weight of N-Brand sodium silicate, 0.81 percent by weight sodium hydroxide, 7.54 percent by weight Alcoa A-2 alumina fines and 54.91 percent by weight water.

Four hundred twenty three cc. per minute of the sulfuric acid-aluminum sulfate and 489 cc. per minute of the alumina fines-sodium silicate solution were mixed in a mixing nozzle to form a sol which set to a hydrogel in 4.5 seconds at 71° F. The sol was formed into spheroidal hydrogen beads by introducing globules of the sol into an oil medium. The resulting hydrogel particles having a pH of 8.8 were treated for 8 hours at 115° F. while covered with water. The hydrogel particles were thereafter base-exchanged with a 1.5 percent by weight aluminum sulfate solution employing 18 two hour batch treatments to remove sodium from the structure of the gel. The hydrogel was thereafter treated with a 0.1 weight percent solution of ammonium sulfate employing two-1 hour batch treatments. The resulting hydrogel was washed free of soluble salts employing 0.01 volume of water per volume of hydrogel per minute. The washed hydrogel was dried in superheated steam at 280° F. for 6 hours and calcined for 3 hours at 1300° F. in air. The resulting gel, which contained 38.3 percent by weight of added calcined alumina, and a Lauson Shaker Attrition of 1450 seconds. The apparent density of the finished catalyst product was 0.98 g./cc. and the diffusivity thereof was 17.3. Gel of the same composition prepared similar to the above, with the exception that no finely calcined alumina was introduced into the sol showed an apparent density of 0.75 g./cc., a Lauson Shaker Attrition of 130 seconds, and a diffusivity of 5.

A series of high density catalysts prepared according to the procedure of Example 1 but containing varying quantities of Alcoa A-2 alumina having a weight mean particle diameter of 4.1 microns were produced and tested for diffusivity and for physical durability in the Lauson Shaker Attrition test. The data obtained in such tests are shown graphically in Figure 1 of the attached drawing wherein the diffusivity and the LSA test results showing the time in seconds required to produce 50 weight percent of fines are plotted against the weight percent concentration of A-2 alumina powder. It will be seen from the data of Figure 1 that as the content of A-2 alumina powder was increased above about 30 percent by weight, the diffusivity of the catalyst increased and the attrition resistance of the catalyst decreased. In accordance with the present invention in order to obtain a catalyst characterized by a high diffusivity and high attrition resistance, it is preferred to maintain the concentration of added finely divided alumina within the range of 30 to 45 percent by weight. It will be appreciated that the particular amount of added alumina within the aforementioned range will be dependent upon its particle size as well as on the other factors and conditions involved in preparation of the catalyst. Thus, with the use of finely divided alumina characterized by a weight mean particle diameter of about 4 microns, the concentrations of added finely divided alumina is desirably in the range of about 36 to about 40 percent by weight of the catalyst product.

A series of high density catalysts were prepared in accordance with the general procedure of Example 1 with variation in the weight ratio of sulfuric acid to aluminum sulfate in the acidic aluminum salt forming solution and the ratio of sodium oxide to silica in the sodium silicate forming solution, while maintaining, the pH, the content of cogelled alumina and product concentration constant. The effect on flocculation of the finely divided calcined alumina was noted in each instance. The results are set forth below:

| Cogelled Alumina Content | pc. | pH | Weight Ratio | | Flocculation of Alumina Powder |
|---|---|---|---|---|---|
| | | | $H_2SO_4/Al_2(SO_4)_3$ | $Na_2O/SiO_2$ | |
| 10.5 | 11.0 | 8.7±0.1 | 0.51 | 0.40 | None. |
| 10.5 | 11.0 | 8.7±0.1 | 0.28 | 0.37 | None. |
| 10.5 | 10.8 | 8.7±0.1 | 0.18 | 0.34 | Trace. |
| 10.6 | 10.8 | 8.7±0.1 | 0.09 | 0.32 | Slight. |
| 10.5 | 10.8 | 8.7±0.1 | 0.00 | 0.31 | Heavy. |

It will be seen from the above data that the minimum weight ratio of sulfuric acid to aluminum sulfate in the acidic aluminum salt forming solution should be 0.18, corresponding to an equivalent ratio of hydrogen to aluminum of 0.21, and the minimum weight ratio of sodium oxide to silica in the sodium silicate forming solution should be 0.34 in order to prevent flocculation of the added alumina powder. As noted hereinabove, flocculation has been found to result in undesirable physically weak catalyst particles. It is accordingly essential in production of highly attrition resistant catalyst particles that the above-indicated minimum weight ratios in the forming solutions be exceeded in order to prevent undesired flocculation with the resultant formation of a physically weak catalyst product.

Figure 2:
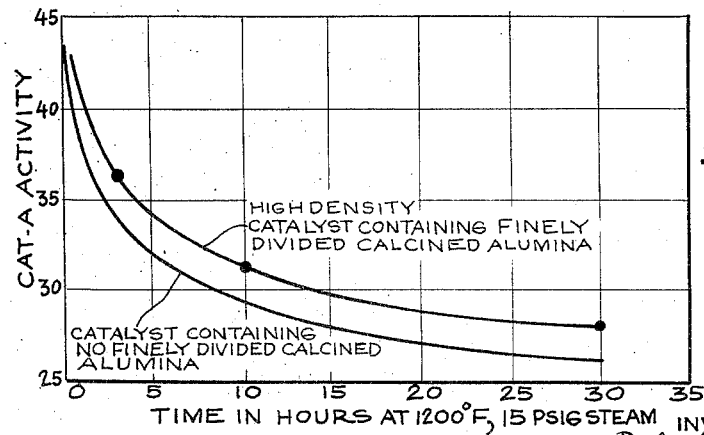
Figure 3:
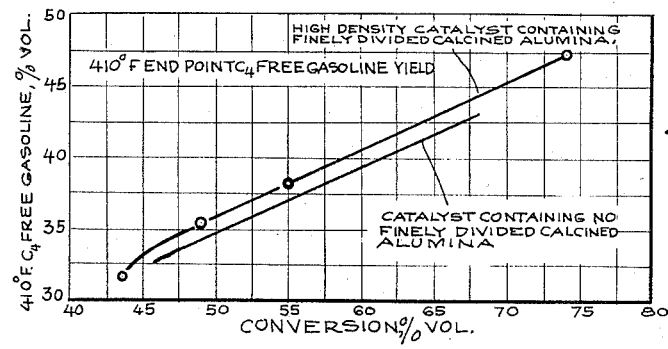
Figure 4:
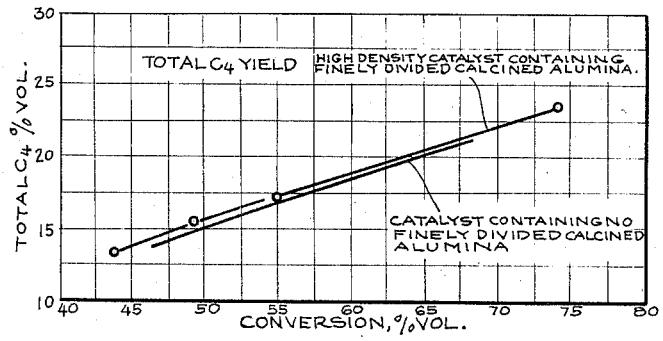
Figure 5:
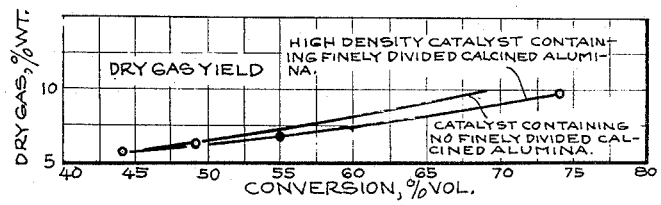
Figure 6:
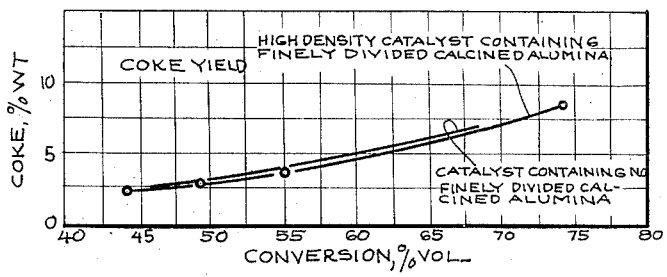

The steam stability of the high density catalyst of the present invention was determined by subjecting the same to a 100 percent steam atmosphere at 1200° F. and a pressure of 15 p.s.i.g. for varying periods of time, and determining the Cat-A activity in accordance with the procedure described in National Petroleum News, page R-537, August 2, 1944, of such steamed catalyst as well as of the unsteamed catalyst. The results of such test procedure are shown in Figure 2 of the drawing wherein the Cat-A activity is plotted against the time of steam treatment for the catalyst of the present invention as well as for a control catalyst sample in which no finely divided calcined alumina had been added to the silica-alumina hydrosol during formation. It will be seen from the plotted data that in every instance the steam stability of the catalyst of the present invention, as indicated by the decrease in Cat-A activity with time of treatment, was better than the steam stability of the comparable control catalyst sample containing no added finely divided calcined alumina.

Cracking of a charge stock of Mid-Continent gas oil having a boiling range of 450 to 950° F. to gasoline having an end point of 410° F. was carried out by passing vapors of said gas oil through the catalyst at 875° F., substantially atmospheric pressure and a feed rate of 1.5 volumes of liquid oil per volume of catalyst per hour for ten minute runs between regenerations utilizing the catalyst of the present invention and a comparable control catalyst containing no added finely divided calcined alumina. The results of such test procedure are shown in Figures 3–6 of the drawing wherein the yields of gasoline, $C_4$'s, dry gas and coke were respectively plotted in each instance against the percent volume conversion. It will be seen from the plotted data that at the same conversion level the catalyst of the present invention in every instance afforded a higher yield of gasoline and $C_4$'s as well as less dry gas and coke in comparison with the control catalyst.

Catalytic hydrocarbon conversion, utilizing the catalyst described herein, may be carried out at catalytic cracking conditions employing a temperature within the approximate range of 700° F. to 1200° F. and under a pressure ranging from subatmospheric pressure up to several hundred atmospheres. The contact time of the oil with the catalyst is adjusted in any case according to the conditions, the particular oil feed and the particular results desired to give a substantial amount of cracking to lower boiling products.

As is well known, minute amounts of metal contaminant such as nickel, copper, iron, vanadium and the like are highly detrimental to the efficiency of silica-alumina cracking catalysts. Such catalysts containing even an extremely small amount of metal contaminant exhibit decreased activity and excessive coke formation during cracking reactions. In fact, commercial experience with such poisoned catalysts shows about 50 percent more coke made by the catalyst at equilibrium activity than is produced by the catalyst in unpoisoned condition. Moreover, since the major portion of the catalyst remains in the cracking system over an extended period of time with recirculation, the amount of metal contaminant gradually builds up to such point that further contact of the cracking charge with the catalyst becomes an uneconomical operation. It would appear that the metal contaminant is introduced with the charge stock or it may be eroded from the equipment. Regardless of its manner of introduction, the presence of nickel or other metal contaminant in the silica-alumina cracking catalyst employed is definitely detrimental, leading to the production of an excessive amount of coke and a reduced gasoline/coke ratio.

It has been found that the high density cracking catalyst of the present invention is more resistant to metal poisoning when employed in catalytic cracking of a hydrocarbon charge than comparable control catalyst which did not contain finely divided calcined alumina. A sample of the high density silica-alumina catalyst of the present invention was impregnated with 250 p.p.m. of nickel from a nickel nitrate solution, air tempered at 1300° F. for 3 hours and evaluated in cracking a Mid-Continent gas oil charge boiling in the approximate boiling range of 450 to 950° F. to gasoline having an end point of 410° F. by passing vapors of said gas oil through the catalyst at 875° F., substantially atmospheric pressure and a feed rate of 1.5 volumes of liquid oil per volume of catalyst per hour for ten minute runs between regenerations. The control catalyst of silica-alumina also containing 250 p.p.m. of nickel was tested under identical conditions. The cracking data obtained in each case are set forth below:

| | High Density Catalyst | Control Catalyst |
|---|---|---|
| Gasoline, Percent Vol | 34.5 | 30.4 |
| Total $C_4$, Percent Vol | 13.9 | |
| Dry Gas, Percent Wt | 5.9 | 6.5 |
| Coke, Percent Wt | 4.1 | 7.2 |
| Gasoline/Coke Ratio | 8.4 | 4.2 |
| Conversion, Percent Vol | 48.3 | 48.3 |
| Hydrogen, Percent Wt | 0.27 | 0.80 |

It will be seen from the above data that cracking carried out in the presence of the catalyst of the invention makes less coke, less hydrogen, more gasoline and has a gasoline/coke ratio of about twice that of the control catalyst in which no added finely divided alumina was present under identical conditions of conversion and at the same nickel level. In addition, because of the difference in catalyst density of 1.04 gram per cc. for the high density catalyst as compared with 0.77 gram per cc. of the control catalyst, about 20 percent more charge stock is required to lay down the same nickel concentration of the high density catalyst.

We claim:

1. A method for preparing an attrition resistant catalyst consisting essentially of silica and alumina, highly stable to deactivation by steam, characterized by a high diffusivity and an apparent density of at least 0.9 gram per cubic centimeter which comprises dispersing in a silica-alumina sol containing, on a dry basis, a major proportion of silica and a minor proportion of between about 10 and about 15 percent by weight of alumina, an amount corresponding to between about 30 and about 45 percent by weight of the resulting dry composite of finely divided alpha alumina which has undergone previous calcination at a temperature in excess of 2000° F. and which has a weight mean particle diameter of between about 2 and about 7 microns, the concentrations and proportions of reactants being such that the resulting silica-alumina sol having the finely divided calcined alpha alumina dispersed therein has a pH of between 8.5 and 9 and a product concentration of between 10 and 15, permitting the resulting sol to set to a hydrogel, hydrothermally treating the resulting hydrogel at a temperature of between 80° F. and 200° F. for 6 to 24 hours, washing the hydrogel free of water soluble matter, drying and calcining.

2. A method for preparing an attrition resistant catalyst consisting essentially of silica and alumina, highly stable to deactivation by steam, characterized by a high diffusivity and an apparent density of at least 0.9 gram per cubic centimeter which comprises dispersing in a silica-alumina sol containing, on a dry basis, a major proportion of silica and a minor proportion of between about 10 and about 15 percent by weight of alumina prepared by intimately contacting an aqueous acidic solution of a water-soluble aluminum salt in which the equivalent ratio of hydrogen to aluminum is at least 0.21 and an aqueous alkali metal silicate solution in which the weight ratio of alkali metal oxide to silica is at least 0.34, an amount corresponding to between about 30 and about 45 percent by weight of the resulting dry composite of finely divided alpha alumina which has undergone previous calcination at a temperature in excess of 2000° F. and which has a weight mean particle diameter of between about 2 and about 7 microns, the concentrations and proportions of reactants being such that the resulting silica-alumina sol having the finely divided calcined alpha alumina dispersed therein has a pH of between 8.5 and 9 and a product concentration of between 10 and 15, permitting the resulting sol to set to a hydrogel, hydrothermally treating the resulting hydrogel at a temperature of between 80° F. and 200° F. for 6 to 24 hours, base-exchanging zeolitic alkali metal from the hydrothermally treated hydrogel, washing the hydrogel free of water-soluble matter, drying and calcining.

3. A method for perparing an attrition resistant catalyst consisting essentially of silica and alumina, highly stable to deactivation by steam, characterized by a high diffusivity and an apparent density of between 0.9 and 1.10 grams per cubic centimeter which comprises dispersing in a silica-alumina sol containing, on a dry basis, a major proportion of silica and a minor proportion of between about 10 and about 15 percent by weight of alumina and prepared by intimately contacting an aqueous acidic solution of a water soluble aluminum salt in which the equivalent ratio of hydrogen to aluminum is at least 0.21, an aqueous alkali metal silicate solution in which the weight ratio of alkali metal to silica is at least 0.34 and an aqueous slurry of finely divided alpha alumina which has undergone previous calcination at a temperature in excess of 2000° F. and which has a weight mean particle diameter of between about 2 and about 7 microns present in an amount corresponding to between about 30 and about 45 percent by weight of the resulting dry composite, under conditions such that the resulting silica-alumina hydrosol, having the finely divided calcined alpha alumina dispersed therein has a pH of between 8.5 and 9 and a product concentration of between 10 and 15 permitting the resulting sol to set to a hydrogel, hydrothermally treating the resulting hydrogel at a temperature of between about 80° F. and about 200° F. for 6 to 24 hours, base exchanging zeolitic alkali metal from the treated hydrogel, washing the hydrogel free of water soluble matter and drying and calcining.

4. A method for preparing an attrition resistant catalyst consisting essentially of silica and alumina, highly stable to deactivation by steam, characterized by a high diffusivity and an apparent density of at least 0.9 gram per cubic centimeter which comprises dispersing in a silica-alumina sol containing, on a dry basis, a major proportion of silica and a minor proportion of between about 10 and about 15 percent by weight of alumina prepared by intimately contacting an aqueous acidic solution of a water-soluble aluminum salt in which the equivalent ratio of hydrogen to aluminum is at least 0.21 and an aqueous alkali metal silicate solution in which the weight ratio of alkali metal oxide to silica is at least 0.34, an amount corresponding to between about 30 and about 45 percent by weight of the resulting dry composite of finely divided alpha alumina which has undergone previous calcination at a temperature in excess of 2000° F. and which has a weight mean particle diameter of between about 2 and about 7 microns, the concentrations and proportions of reactants being such that the resulting silica-alumina sol having the finely divided calcined alpha alumina dispersed therein has a pH of between 8.5 and 9 and a product concentration of between 10 and 15, permitting the resulting sol to set to a hydrogel, hydrothermally treating the resulting hydrogel at a temperature of between 80° F. and 200° F. for 6 to 24 hours, base-exchanging zeolitic alkali metal from the hydrothermally treated hydrogel with aluminum to yield a product in which the alumina content other than that attributable to the added finely divided calcined alpha alumina, is between about 13 and about 18 percent by weight on a dry basis, washing the hydrogel free of water-soluble matter and drying and calcining.

5. A method for preparing spheroidal particles of an attrition resistant catalyst consisting essentially of silica and alumina, highly stable to deactivation by steam, characterized by a high diffusivity and an apparent density of at least 0.9 gram per cubic centimeter which comprises dispersing in a silica-alumina sol containing, on a dry basis, a major proportion of silica and a minor proportion of between about 10 and about 15 percent by weight of alumina, an amount corresponding to between about 30 and about 45 percent by weight of the resulting dry composite of finely divided alpha alumina which has undergone previous calcination at a temperature in excess of 2000° F. and which has a weight mean particle diameter of between about 2 and about 7 microns, the concentrations and proportions of reactants being such that the resulting silica-alumina sol having the finely divided calcined alpha alumina dispersed therein has a pH between 8.5 and 9 and a product concentration of between 10 and 15, introducing globules of the resulting hydrosol into a column of water-immiscible liquid wherein the globules of hydrosol set to spheroidal hydrogel, effecting gelation of said spheroidal hydrosol particles, hydrothermally treating the resulting hydrogel particles at a temperature of between 80° F. and 200° F. for 6 to 24 hours, washing the spheroidal hydrogel particles free of water-soluble matter and drying and calcining.

6. An attrition resistant catalyst composition consisting essentially of silica and alumina, highly stable to deactivation by steam, characterized by a high diffusivity and an apparent density of at least 0.9 gram per cubic centimeter prepared by dispersing in a silica-alumina sol containing, on a dry basis, a major proportion of silica and a minor proportion of between about 10 and about 15 percent by weight of alumina, an amount corresponding to between about 30 and about 45 percent by weight of the resulting dry composite of finely divided alpha alumina which has undergone previous calcination at a temperature in excess of 2000° F., and which has a weight mean particle diameter of between about 2 and about 7 microns, the concentrations and proportions of reactants being such that the resulting silica-alumina sol having the finely divided calcined alpha alumina dispersed therein has a pH of between 8.5 and 9 and a product concentration of between 10 and 15, permitting the resulting sol to set to a hydrogel, hydrothermally treating the resulting hydrogel at a temperature of between 80° F. and 200° F. for 6 to 24 hours, washing the hydrogel free of water soluble matter, drying and calcining.

7. An attrition resistant catalyst composition in the form of spheroids consisting essentially of silica and alumina, highly stable to deactivation by steam, characterized by a high diffusivity and an apparent density of at least 0.9 gram per cubic centimeter prepared by dispersing in a silica-alumina sol containing, on a dry basis, a major proportion of silica and a minor proportion of between about 10 and about 15 percent by weight of alumina, an amount corresponding to between about 30 and about 45 percent by weight of the resulting dry composite of finely divided alpha alumina which has undergone previous calcination at a temperature in excess of 2000° F. and which has a weight mean particle diameter of between about 2 and about 7 microns, the concentrations and proportions of reactants being such that the resulting silica-alumina sol having the finely divided calcined alpha alumina dispersed therein has a pH between 8.5 and 9 and a product concentration of between 10 and 15, introducing globules of the resulting hydrosol into a column of water-immiscible liquid wherein the globules of hydrosol set to spheroidal hydrogel, effecting gelation of said spheroidal hydrosol particles, hydrothermally treating the resulting hydrogel particles at a temperature of between 80° F. and 200° F. for 6 to 24 hours, washing the spheroidal hydrogel particles free of water-soluble matter and drying and calcining.

References Cited in the file of this patent

UNITED STATES PATENTS

| | | |
|---|---|---|
| 2,487,065 | Milliken | Nov. 8, 1949 |
| 2,631,983 | Milliken | Mar. 17, 1953 |
| 2,665,258 | Lebeis | Jan. 5, 1954 |